United States Patent
Mlika et al.

(10) Patent No.: US 11,475,184 B1
(45) Date of Patent: Oct. 18, 2022

(54) REAL-TIME FINITE ELEMENT METHOD SOLVING FOR CONTACT ON CARTESIAN GRIDS WITH LEVEL-SET GEOMETRY DESCRIPTION

(71) Applicant: Ansys, Inc., Canonsburg, PA (US)

(72) Inventors: Rabii Mlika, Villeurbanne (FR); Emmanuel Delor, Lyons (FR)

(73) Assignee: Ansys, Inc., Canonsburg, PA (US)

( * ) Notice: Subject to any disclaimer, the term of this patent is extended or adjusted under 35 U.S.C. 154(b) by 228 days.

(21) Appl. No.: 16/722,642

(22) Filed: Dec. 20, 2019

(51) Int. Cl.
| | | |
|---|---|---|
| *G06G 7/48* | (2006.01) | |
| *G06F 30/23* | (2020.01) | |
| *G06F 30/12* | (2020.01) | |
| *G06F 111/10* | (2020.01) | |

(52) U.S. Cl.
CPC .............. *G06F 30/23* (2020.01); *G06F 30/12* (2020.01); *G06F 2111/10* (2020.01)

(58) Field of Classification Search
CPC ....... G06F 30/23; G06F 30/12; G06F 2111/10
See application file for complete search history.

(56) References Cited

U.S. PATENT DOCUMENTS 10,878,147 B1 * 12/2020 Gelten .................... G06F 17/13

OTHER PUBLICATIONS

Haikai, G., and K. D. Hjelmstad. "A finite element formulation of non-smooth contact based on oriented volumes for quadrilateral and hexahedral elements." Computer Methods in Applied Mechanics and Engineering 196.45-48 (2007): 4690-4711.*

Guo, Yi, and Robert G. Parker. "Stiffness matrix calculation of rolling element bearings using a finite element/contact mechanics model." Mechanism and machine theory 51 (2012): 32-45.*

Claus, Susanne, and Pierre Kerfriden. "A stable and optimally convergent LaTIn-CutFEM algorithm for multiple unilateral contact problems." International Journal for Numerical Methods in Engineering 113.6 (2018): 938-966.*

Liu, Peng, and Venkata Dinavahi. "Real-time finite-element simulation of electromagnetic transients of transformer on FPGA." IEEE Transactions on Power Delivery 33.4 (2018): 1991-2001.*

Akula, Basava Raju, Julien Vignollet, and Vladislav A. Yastrebov. "Stabilized MorteX method for mesh tying along embedded interfaces." arXiv preprint arXiv:1902.04003 (2019).*

Akula, Basava Raju, Julien Vignollet, and Vladislav A. Yastrebov. "MorteX method for contact along real and embedded surfaces: coupling X-FEM with the Mortar method." arXiv preprint arXiv:1902.04000 (2019).*

* cited by examiner

*Primary Examiner* — Rehana Perveen
*Assistant Examiner* — Nithya J. Moll
(74) *Attorney, Agent, or Firm* — Jones Day

(57) ABSTRACT

A contact problem for characterizing physical contact between two or more bodies is solved by receiving a level-set description of a geometry in a Cartesian grid comprising a plurality of cells. The geometry includes a boundary. Thereafter, the boundary is triangularized for each cell intersecting the boundary to result in a plurality of triangles. A surfacic Gauss integration rule is generated on each triangle using an interpolation of volumetric coordinates. Subsequently, a target point is computed for each Gauss point that corresponds to a projection of such Gauss point on a target surface. The computed target points are then used to integrate contact on the triangles. The problem can then be solved to compute a displacement field respecting contact conditions. Related apparatus, systems, techniques and articles are also described.

20 Claims, 5 Drawing Sheets

REAL-TIME FINITE ELEMENT METHOD SOLVING FOR CONTACT ON CARTESIAN GRIDS WITH LEVEL-SET GEOMETRY DESCRIPTION

TECHNICAL FIELD

The subject matter described herein relates to enhanced techniques for physical system modeling through finite element modeling of contact on a Cartesian grid without adapting meshes.

BACKGROUND

The finite element method (FEM) is a numerical technique for solving engineering and mathematical physics problems which are described by partial differential equations or can be formulated as functional minimization. A domain of interest is represented by subdividing a larger system into finite elements.

Classically, the discretization of the domain into elements feats the geometry. However, due to some specificities of the physics and a solver architecture, the elements cannot conform with the geometry. This is the case of the Cartesian grid discretization where the geometry is not described by the finite elements, but it is given by level-set.

On another hand, one of the classic problems solved by FEM is the contact between two deformable solids. From a mathematical point of view the contact is formulated as a boundary value problem in which the main constraint is the geometrical non-inter penetration. The effort transfer between contacting bodies has to be modeled in such a way as to comply with Newton's second law. However, this modeling problem is extremely complex to describe and solve mathematically as well as numerically. In particular, a nonlinear boundary condition is present because the permitted relative displacements and efforts on the contact surface must be negative and complementary. The contact constraints constitute a boundary inequality instead of a classic variational equality. Solving this problem on a Cartesian mesh framework is even more complex because the mesh does not feat the boundary.

SUMMARY

In a first aspect, a contact problem for characterizing contact between two or more bodies is solved by receiving a level-set description of a geometry in a Cartesian grid comprising a plurality of cells. The geometry includes a boundary. Thereafter, the boundary is triangularized for each cell intersecting the boundary to result in a plurality of triangles. A surfacic Gauss integration rule is generated on each triangle using an interpolation of volumetric coordinates. Subsequently, a target point is computed for each Gauss point that corresponds to a projection of such Gauss point on a target surface. The computed target points are then used to integrate contact on the triangles. The problem can then be solved to compute a displacement field respecting contact conditions.

Contact integrals can be added to a stiffness matrix through an interpolation on regular grid nodes.

A visualization can be displayed in a graphical user interface based on the computed displacement field.

The contact conditions can be formulated (e.g., weakly formulated, etc.) in a fictitious domain framework through a surface integral on the triangles.

The level-set description of the geometry approximates a boundary of the objects by a set of triangles on each hexahedron in the Cartesian grid.

The displacement field can be computed using a non-linear solver and, in some cases, in real-time using a massively parallel finite element solver.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for modeling physical systems by allowing for real-time numerical computations involving curves and surfaces on a fixed Cartesian grid without having to parameterize the corresponding objects and without having to adapt any corresponding meshes. Such an arrangement in particular advantageous in that it utilizes fewer computing resources than conventional techniques and additionally provides more rapid results.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for simulating physical systems and, in particular, modeling physical contact between objects. FE analysis is an important tool for characterizing how objects/bodies react to physical effects such as heat, fluid flow, vibration, and the like. Such characterization is particularly useful for ensuring that a product will operate as intended under certain conditions and will continue to operate for a desired amount of time without degradation. In certain variations, a model for a physical system can be generated based on (or including) the disclosed formation of contacts in the physical system. A numerical method can be invoked to identify a solution to this model to simulate the physical system and obtain or predict physical properties, such as stresses, displacements or other applicable contact related physical characteristics of this physical system.

The current subject matter is particularly advantageous in that uses finite element (FE) analysis in a Cartesian grid/level-set framework. Such framework incorporates a massively parallel real-time FE solver which can solve problems including non-linear contact without the need for formulations that adapt any corresponding meshes (thus utilizing fewer computing resources and providing more rapid results). In particular, the current subject matter provides a fictitious domain method (cutFem) formulation to adapt the FE approximation of contact to a Cartesian grid with a level-set description of the geometry of the objects of interest. Combining cutFem with a surface-to-surface contact method as provided herein allows for a massively parallel solution to the contact problem (i.e., how to provide real-time solving without any adaptation of the Cartesian mesh).

The new contact method provided herein can be formulated in the fictitious domain framework. The fictitious domain framework is a method to find the solution of a partial differential equations on a complicated domain D, by substituting a given problem posed on a domain D, with a new problem posed on a simple domain Ω containing D. With the fictitious domain framework, a FE method can be used on a Cartesian grid. The mesh on which elasticity of the objects/surfaces being modeled are interpolated can, for example, be a regular hexahedral mesh.

Figure 1:
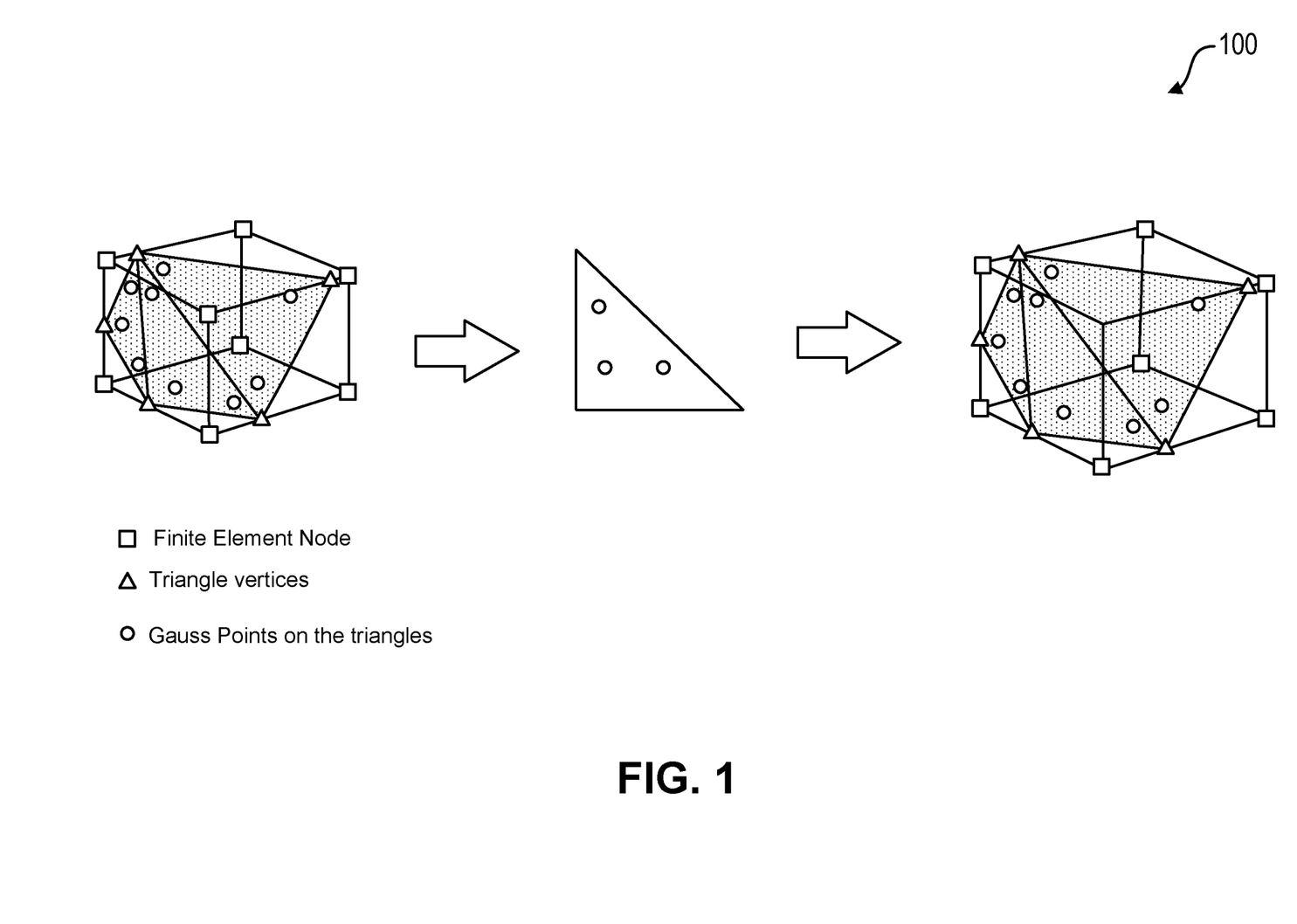
FIG. 1 is a diagram illustrating triangularization of a boundary and Gauss points in relation to finite element nodes.

The geometry of the objects being modeled can be defined by a level-set function on nodes. This level-set is used to approximate the boundary of such objects by a set of triangles on each hexahedron of the Cartesian mesh. The triangles can constitute the boundary on which the contact between surfaces of the objects is integrated. So, unlike traditional formulations of non-linear contact where the mesh is adapted to conform with the geometry, as shown in diagram 100 of FIG. 1, the FE nodes are not located on the contact boundary but the triangles are used to impose weakly (through a surface integration) the contact conditions. In fact, the contact force f=K(U2−U1); where U1 and U2 are the displacement of the contact and target surfaces and K is the contact stiffness; is integrated all along the contact surface instead of being concentrated on contact nodes. As contact conditions will not be imposed on nodes but on the whole surface the described method can be characterized as a surface-to-surface contact method.

Thus, after extracting the boundary triangles from the level-set function, a 2D quadrature rule can be defined on each triangle and the 3D coordinates of each Gauss point can be interpolated. To do this, the triangle can be considered as a 2D element with a linear interpolation rule. The 3D coordinate of each Gauss point can then be obtained by a simple interpolation of the triangle's 3D vertices.

Next, after computation of the contact integrals, the contact integrals can be interpolated to the volumic element on the Hexahedron's nodes. This process of going from volume to surface quantities and back to volume is enables the solving of a surface problem as contact on a volume element. The set of Gauss points and the corresponding target points can be saved to build the contact connectivity between elements.

On the volume element level, the contact integral can be evaluated by using the already built quadrature scheme. This integral will constitute the contact stiffness in the considered volume element. Then, this stiffness is added to the FE nodes by a simple interpolation of the contact integral on the surface. An evaluation of the contact status on every Gauss point is needed to take into account the non-linearity of contact.

Finally, this treatment can be inserted into a solver such as a non-linear solver (a classical Newton-Raphson Loop+a linear solver) to get the displacement field. The principle objective of a displacement based finite element method is to compute the displacement field within a solid subjected to external forces.

Figure 2:
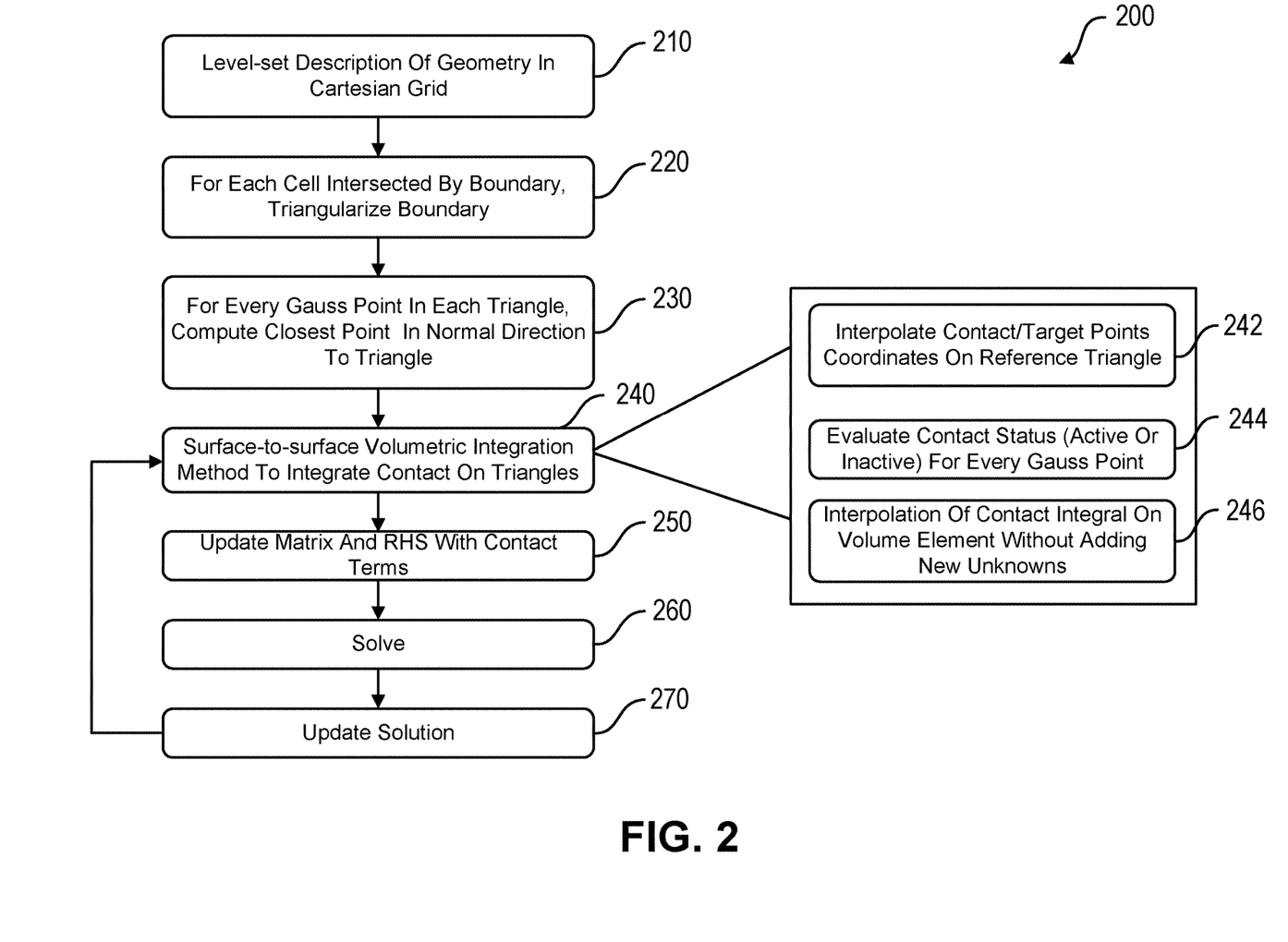
FIG. 2 is a first process flow diagram illustrating a finite element method solving of contact on Cartesian grids with a level-set geometry description.

FIG. 2 is a diagram 200 illustrating the above-referenced process in more details. Initially, at 210, a level-set description of the geometry of the objects to modeled in a Cartesian grid is received. The level set-description defines a plurality of cells as well as a boundary (or boundaries of the object or objects being modeled). Thereafter, at 220, for each cell intersected by the boundary, the boundary can be triangularized. Such triangularization can be performed, for example, using an algorithm for extracting a polygonal mesh to an isosurface from a three-dimensional discrete scalar field such as the marching cubes algorithm.

Next, at 230, a target point can be calculated for each Gauss point. The target points can, for example, be a closest point belonging to another object that is in a normal direction to the triangle. Thereafter, at 240, a surface to surface volumetric integration method (as provided herein) is applied to integrate contact on the triangles. The surface to surface volumetric integration method can, at 242, interpolate target points' coordinates as done with contact points. Thus, the contact force (that depend on both of them) could be integrated. The contact status can, at 244, then be evaluated for each Gauss point. The contact status indicates whether the contact is active or inactive: If, in a given Gauss point, the gap between the contacting surfaces is negative: the two bodies are touching in this point; then the contact is active, and the contact force is not null. On the other case, the gap is open (>0) then the force is null, and the contact is not active. This dependency of the contact force on the contact status is what generate the non-linearity of the problem. Next, at 246, the contact integral can be interpolated on the volume element without adding new unknowns.

After the integration of the contact on the triangles, at 240, the linear system (matrix and Right-Hand Side vector) are updated, at 250, with the computed contact Integral that we interpolate to nodes. This system is passed at 260 to the linear solver. After the solve, the displacement solution is updated at 270. Operations 240-270 are repeated as part of a Newton loop until the residual norm becomes less than a given tolerance.

Figure 3:
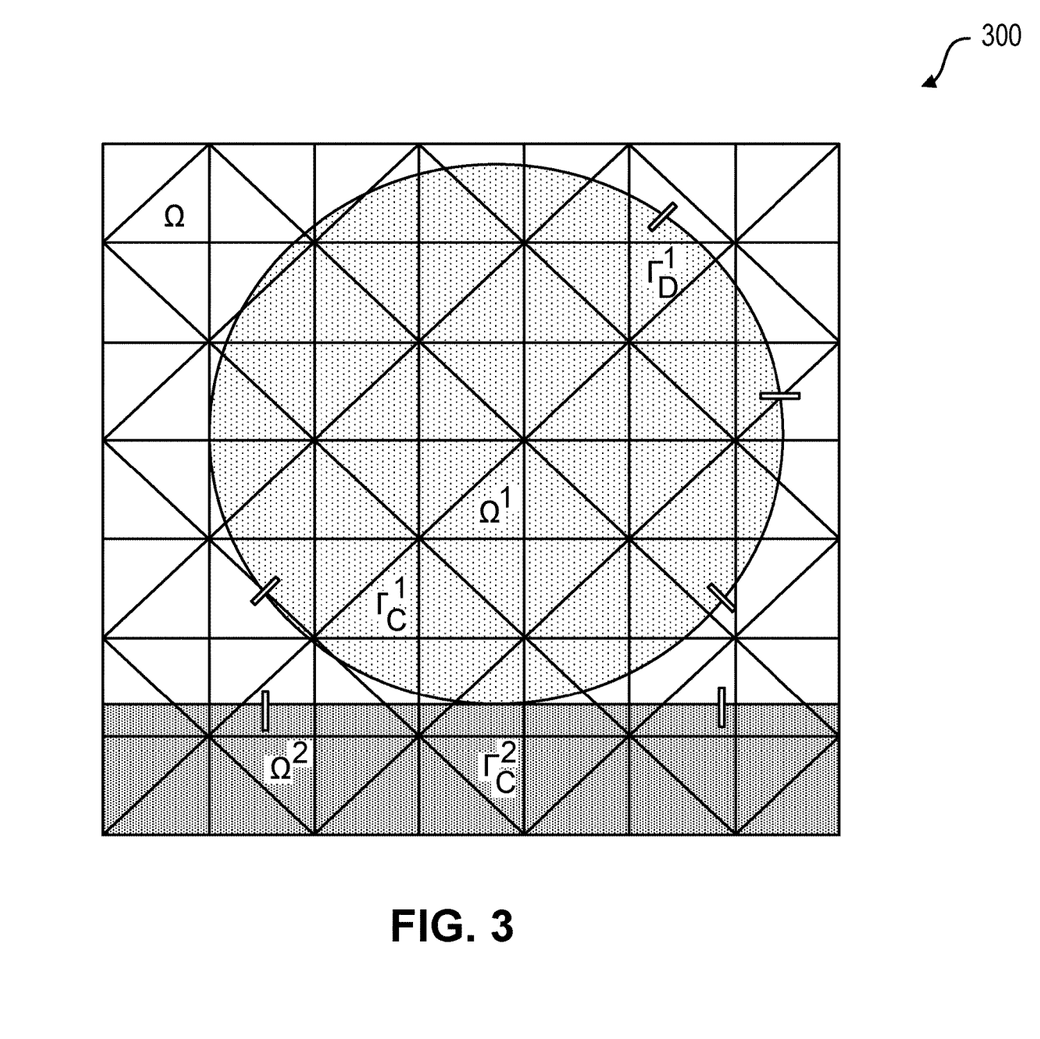
FIG. 3 is a diagram illustrating a fictitious domain and a level-set description of boundaries of contacting bodies.

FIG. 3 is a diagram 300 illustrating a fictitious domain framework and a level-set description of the boundaries of the contacting bodies. In this illustration, contact is to be imposed on the surface Fc.

Figure 4:
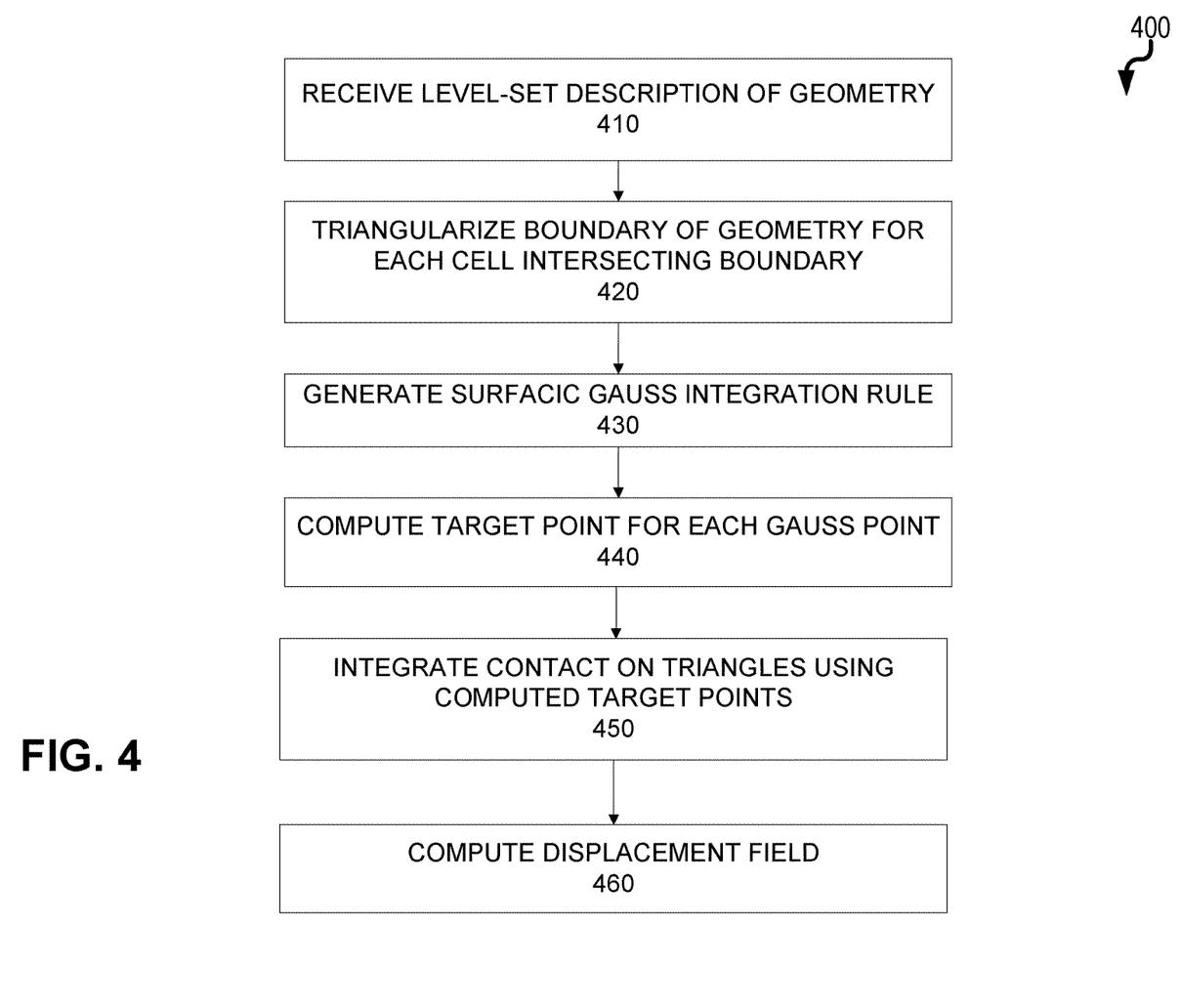
FIG. 4 is a second process flow diagram illustrating a contact integration process and insertion of a surface integral to formulate a surface-to-surface contact method.

FIG. 4 is a process flow diagram 400 illustrating solving of a contact problem for characterizing contact between two or more bodies is solved in which, at 410, a level-set description of a geometry in a Cartesian grid comprising a plurality of cells is received. The geometry includes a boundary. Thereafter, at 420, the boundary is triangularized for each cell intersecting the boundary to result in a plurality of triangles. A surfaic Gauss integration rule is generated, at 430, on each triangle using an interpolation of volumetric coordinates. Subsequently, at 440, a target point is computed for each Gauss point that corresponds to a projection of such Gauss point on a target surface. The computed target points are then used, at 450, to integrate contact on the triangles. The problem can then be solved, at 460, to compute a displacement field respecting contact conditions.

Figure 5:
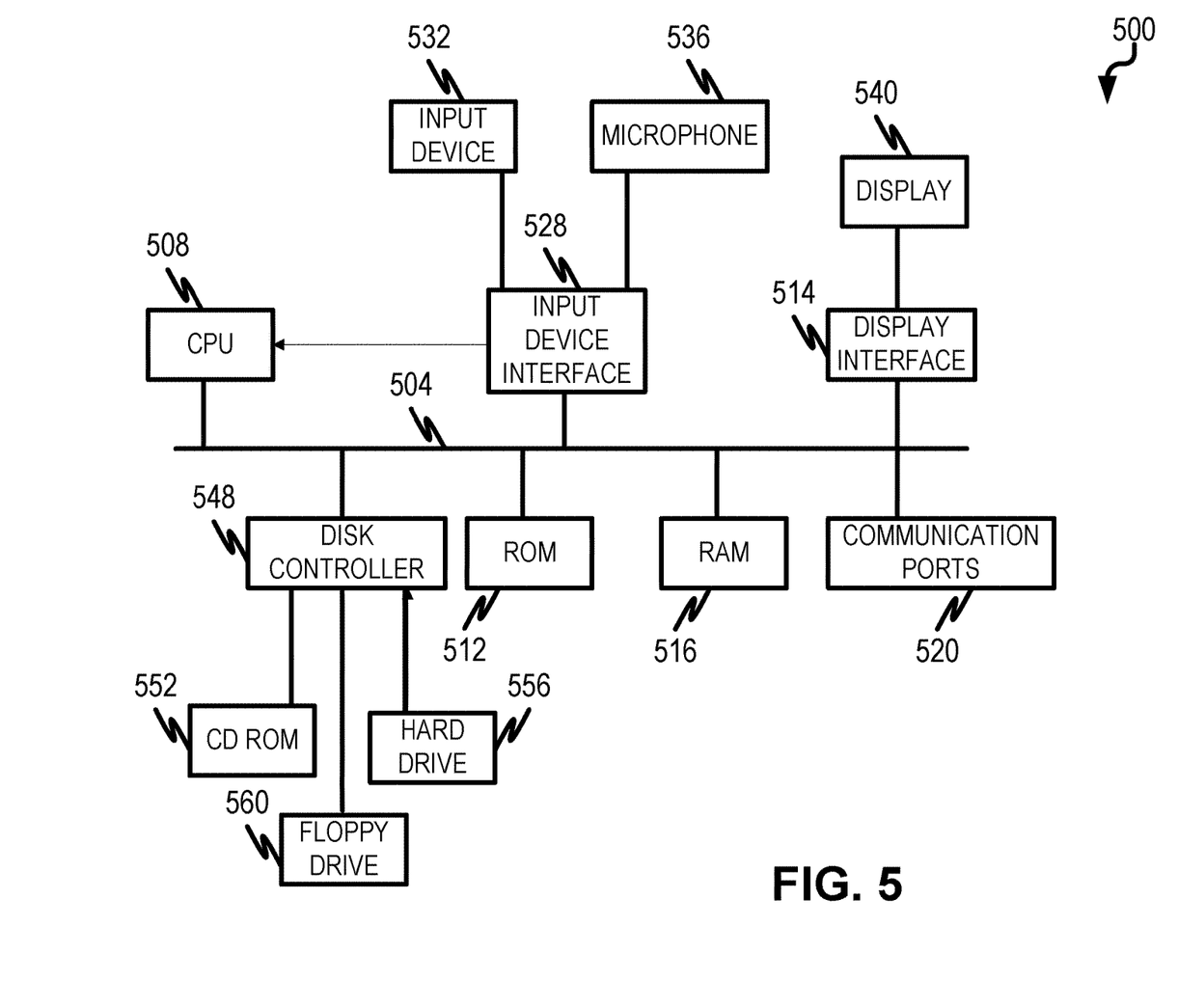
FIG. 5 is a diagram illustrating aspects of a computing device for implementing the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for modeling a physical system using finite element analysis by solving a contact problem for characterizing physical contact between two or more bodies, the method comprising:
   receiving a level-set description of a geometry in a Cartesian grid comprising a plurality of cells, the geometry including a boundary;
   triangularizing the boundary for each cell intersecting the boundary to result in a plurality of triangles;
   generating, on each triangle, a surfacic Gauss integration rule using an interpolation of volumetric coordinates;
   computing, for each Gauss point, a target point that corresponds to a closest point belong to another body in a normal direction to the triangle corresponding to the Gauss point;
   integrating contact on the triangles by applying a surface to surface volumetric integration method using the computed target points, the surface to surface volumetric integration method interpolating coordinates for the target points and evaluating a contact status for each Gauss point as either being active or inactive;
   solving the problem to compute a displacement field respecting contact conditions; and
   rendering, based on the solving, a visualization of a modeled physical system including the two or more bodies in a graphical user interface forming part of a computer-aided engineering (CAE) system.

2. The method of claim 1 further comprising:
   adding contact integrals to a stiffness matrix through an interpolation on regular grid nodes.

3. The method of claim 1, wherein the visualization illustrates contact between the two or more bodies based on the computed displacement field.

4. The method of claim 1, wherein the contact conditions are formulated weakly in a fictitious domain framework through a surface integral on the triangles.

5. The method of claim 1, wherein the level-set description of the geometry approximates a boundary of the bodies by a set of triangles on each hexahedron in the Cartesian grid.

6. The method of claim 1, wherein the displacement field is computed using a non-linear solver.

7. The method of claim 6, wherein the displacement field is generated in real-time using a massively parallel finite element solver.

8. A system for modeling physical systems using finite element analysis by solving a contact problem for characterizing physical contact between two or more bodies, the system comprising:
   at least one data processor; and
   memory comprising instructions which, when executed by the at least one data processor, result in operations comprising:
      receiving a level-set description of a geometry in a Cartesian grid comprising a plurality of cells, the geometry including a boundary;
      triangularizing the boundary for each cell intersecting the boundary to result in a plurality of triangles;
      generating, on each triangle, a surfacic Gauss integration rule using an interpolation of volumetric coordinates;
      computing, for each Gauss point, a target point that corresponds to a closest point belong to another body in a normal direction to the triangle corresponding to the Gauss point;
      integrating contact on the triangles by applying a surface to surface volumetric integration method using the computed target points, the surface to surface volumetric integration method interpolating coordinates for the target points and evaluating a contact status for each Gauss point as either being active or inactive;
      solving the problem to compute a displacement field respecting contact conditions; and
      rendering, based on the solving, a visualization of a modeled physical system including the two or more bodies in a graphical user interface forming part of a computer-aided engineering (CAE) system.

9. The system of claim 8, wherein the operations further comprise:
   adding contact integrals to a stiffness matrix through an interpolation on regular grid nodes.

10. The system of claim 8, wherein the visualization illustrates contact between the two or more bodies based on the computed displacement field.

11. The system of claim 8, wherein the contact conditions are formulated weakly in a fictitious domain framework through a surface integral on the triangles.

12. The system of claim 8, wherein the level-set description of the geometry approximates a boundary of the bodies by a set of triangles on each hexahedron in the Cartesian grid.

13. The system of claim 8, wherein the displacement field is computed using a non-linear solver.

14. The system of claim 13, wherein the displacement field is generated in real-time using a massively parallel finite element solver.

15. A non-transitory computer program product for modeling physical systems using finite element analysis by solving a physical contact problem for characterizing contact between two or more bodies, the computer program product comprising instructions which, when executed by at least one computing device, result in operations comprising:
   receiving a level-set description of a geometry in a Cartesian grid comprising a plurality of cells, the geometry including a boundary;
   triangularizing the boundary for each cell intersecting the boundary to result in a plurality of triangles;

generating, on each triangle, a surfacic Gauss integration rule using an interpolation of volumetric coordinates;

computing, for each Gauss point, a target point that corresponds to a closest point belong to another body in a normal direction to the triangle corresponding to the Gauss point;

integrating contact on the triangles by applying a surface to surface volumetric integration method using the computed target points, the surface to surface volumetric integration method interpolating coordinates for the target points and evaluating a contact status for each Gauss point as either being active or inactive;

solving the problem to compute a displacement field respecting contact conditions; and rendering, based on the solving, a visualization of a modeled physical system including the two or more bodies in a graphical user interface forming part of a computer-aided engineering (CAE) system.

16. The computer program product of claim 15, wherein the operations further comprise:
adding contact integrals to a stiffness matrix through an interpolation on regular grid nodes.

17. The computer program product of claim 15, wherein the visualization illustrates contact between the two or more bodies based on the computed displacement field.

18. The computer program product of claim 15, wherein the contact conditions are formulated weakly in a fictitious domain framework through a surface integral on the triangles.

19. The computer program product of claim 15, wherein the level-set description of the geometry approximates a boundary of the bodies by a set of triangles on each hexahedron in the Cartesian grid.

20. The computer program product of claim 15, wherein the displacement field is generated in real-time using a massively parallel finite element solver.

* * * * *